United States Patent [19]

Carlsen et al.

[11] Patent Number: 4,753,553

[45] Date of Patent: Jun. 28, 1988

[54] BEARING STRUCTURE AND A FLOATING VESSEL COMPRISING SUCH STRUCTURE

[75] Inventors: Viggo O. Carlsen, Oppegard; Bernt M. Stöylen, Jar, both of Norway

[73] Assignee: Ingenirforretningen Atlas A/S, Oslo, Norway

[21] Appl. No.: 877,741

[22] Filed: Jun. 24, 1986

[30] Foreign Application Priority Data

Jul. 3, 1985 [DK] Denmark ............................ 3042/85

[51] Int. Cl.$^4$ ............................................ E02B 17/00
[52] U.S. Cl. .................................... 405/195; 166/355; 384/308; 405/224
[58] Field of Search ............... 405/195, 196, 202, 203, 405/204, 209, 211, 224; 166/355; 114/264, 265; 384/99, 306, 308

[56] References Cited

U.S. PATENT DOCUMENTS

| | | | |
|---|---|---|---|
| 2,631,901 | 3/1953 | Holben et al. | 384/99 |
| 3,033,619 | 5/1962 | Ertl et al. | 384/308 |
| 3,598,369 | 2/1969 | Yielding . | |
| 3,735,597 | 2/1972 | Guy . | |
| 3,895,495 | 1/1974 | Akazaki et al. . | |
| 3,906,736 | 9/1975 | Van Houten et al. | 405/195 |
| 3,934,658 | 9/1974 | Nelson . | |
| 4,213,720 | 7/1980 | Portass | 405/195 |
| 4,252,469 | 2/1981 | Blight et al. | 405/204 |
| 4,542,995 | 9/1985 | Shibasaki et al. | 384/308 |
| 4,544,285 | 10/1985 | Shapiro et al. | 384/99 |

FOREIGN PATENT DOCUMENTS

| | | |
|---|---|---|
| 111612 | 9/1968 | Denmark . |
| 1812174 | 10/1969 | Fed. Rep. of Germany . |
| 2132060 | 8/1975 | Fed. Rep. of Germany . |
| 1603436 | 4/1971 | France . |
| 5217638 | 5/1972 | Japan . |
| 373800 | 2/1975 | Sweden . |
| 1201920 | 12/1967 | United Kingdom . |
| 1234551 | 1/1969 | United Kingdom . |
| 0848792 | 7/1981 | U.S.S.R. ............................ 384/99 |
| 861169 | 9/1981 | U.S.S.R. . |

*Primary Examiner*—Dennis L. Taylor
*Attorney, Agent, or Firm*—Merchant, Gould, Smith, Edell, Welter & Schmidt

[57] ABSTRACT

A bearing structure which may, for example, be used for rotatable mounting of a turret or a rig (11) on the hull (14) of a vessel comprises a first annular bearing surface which is supported by the vessel hull (14), and which may be substantially plane or cylindrical. A second annular bearing surface which is in engagement with and supported by the first bearing surface is formed on the turret or rig (11). The hull (14) of the vessel is exposed to heavy forces caused by wind and waves, and such forces may cause deformations of the hull and consequently of said first bearing surface. In order to compensate for such deformations, the first bearing surface is divided into sections, and position control means, such as mechanical, pneumatic, or hydraulic spring means, are provided for maintaining all of the bearing surface sections in abutting engagement with said second bearing surface formed on the turret or rig (11). The said hydraulic spring means may be in the form of hydraulic cylinders or jacks to which hydraulic fluid is supplied at a pressure which is increased when the distance between the respective bearing surface section and the supporting part of the hull is decreased due to deformation of the hull, and vice versa.

26 Claims, 5 Drawing Sheets

BEARING STRUCTURE AND A FLOATING VESSEL COMPRISING SUCH STRUCTURE

The present invention relates to a bearing structure adapted to rotatably support heavy structures and thus to transmit extremely high loads.

Drilling and production vessels for use in offshore exploitation of oil and gas resources are normally provided with a rig or turret which is rotatably mounted on the hull of the vessel or ship by means of a bearing structure. The vessel may then be anchored at a desired position by means of a number of mooring lines extending from winches mounted on the rig or turret to anchoring devices at the bottom of the sea. Because the rig or turret may rotate about its vertical axis in relation to the hull of the vessel, the turret or rig may be kept substantially stationary even when the orientation of the hull of the ship or vessel is shifting due to varying wind and current conditions, provided that the frictional forces of the bearing structure are sufficiently small to allow rotation of the turret relative to the hull, whereby undue twisting of the mooring lines are avoided.

Up till now the bearing structures used for mounting the turret or rig have been slide bearings comprising cooperating annular plane or cylindrical bearing surfaces, or roller bearings comprising rollers or wheels rotatably mounted on shafts and rolling on an annular race surface. The dimensions of such bearing structures are rather big. As an example, the diameter of the annular bearing surfaces of a slide bearing and of the race surface of a roller bearing may be in the order of 20 m, and the diameter of each roller of a roller bearing may be about 0.8 m. One of the annular bearing surfaces of the slide bearing or the race surface of the roller bearing is supported by the relatively flexible deck portion of the vessel or ship hull, and when the hull is exposed to extremely varying stresses owing to varying wind and current conditions, the bearing surface supported by the deck portion of the hull will quite often deviate substantially from its desired plane or cylindrical shape. This distortion of one of the bearing surfaces gives rise to severe problems including increased frictional forces in the bearing structure, local stress concentrations in the bearing structure and in the supporting deck portion of the hull, and increased wear on the bearing parts with resulting necessary repairs or replacement of parts.

In order to eliminate or substantially reduce the above problems the present invention provides a bearing structure comprising a first annular bearing surface divided into sections and supported by a deformable structure, a second annular bearing surface engaging with and supported by said first bearing surface, said first and second bearing surfaces being mutually rotatable about an axis of rotation, and position control means for controlling the position of said bearing surface sections so as to maintain said sections in supporting engagement with said second bearing surface despite possible deformation of said deformable structure.

The second bearing surface may be substantially cylindrical or substantially plane depending on whether the bearing structure is an axial or a radial bearing. The position control means may be of any type suitable for controlling the position of the bearing surface sections so as to maintain said sections in supporting engagement with said second bearing surface. As an example, the position control means may comprise pneumatic and/or mechanical spring means, such as heavy rubber springs or coil springs or similar spring means made from an elastic material, for biasing individual bearing blocks or members on which the bearing surface sections are defined, into engagement with the second bearing surface. Such position control means may compensate for possible distortion or deflection of the supporting structure, such as a deck portion of a ship hull on which the sections of the first bearing surface are mounted. As an example, buffer-type friction springs produced by Ringfeder GmbH, Krefeld, Western Germany, for use on railway carriages, may be used.

In a preferred embodiment of the bearing structure according to the invention, wherein each of the bearing surface sections is defined by a surface part formed on bearing block, the position or level control means comprises pressure medium operated cylinders or jacks supporting the bearing blocks. The supply of pressure medium, which is preferably liquid, to the cylinders or jacks may then be controlled by mechanical, pneumatic and/or electronic control means so as to maintain all of the sections of the first bearing surface in supporting engagement or contact with the second bearing surface even when the structure, such as the deck portion of a ship's hull, on which the bearing blocks and the associated cylinders or jacks are mounted, is exposed to deflexion or distortion. Thus, the control means may comprise sensors for sensing possible deflection or distortion of the structure supporting said first bearing surface and means for actuating said pressure medium cylinders or jacks so as to compensate for such deflexion or distortion.

Each of the bearing blocks is preferably mounted so as to be freely tiltable in relation to the associated supporting pressure medium cylinder or jack. Each bearing block or member and the bearing surface section defined thereon may then freely adapt its position so as to compensate for possible irregularities of the second bearing surface with which it is in contact. Thus, in a preferred embodiment a surface part formed as a spherical segment on each bearing block is in engagement with a complementary surface part on the supporting pressure medium cylinder or jack so that each bearing surface section may be tilted in any direction.

The pressure medium cylinders or jacks may be controlled in any suitable manner so as to obtain an optimum support of the load or structure on which the second bearing surface is formed. Thus, it may be advantageous to control the function of the cylinder or jacks so that they tend to maintain the original substantially plane or cylindrical shape of the first bearing surface formed by the bearing surface sections. This could, for example, be done by controlling the pressure of the medium supplied to the cylinders or jacks in response to the varying distance between the respective first bearing surface sections and their supporting structure such as the deck of a ship or vessel. Thus, the pressure of the pressure medium is preferably increased in response to a reduced distance and vice versa. The pressure of the pressure medium supplied to the cylinders or jacks may be controlled in accordance with a predetermined relationship, for example by means of an electronic control device or computer receiving distance signals from suitably positioned sensors. As an example, the pressure may be increased proportional to the decrease in distance, and vice versa. However, in order to avoid undue local loads or stresses, the pressure medium supply means are preferably adapted to limit said pressure increase to a predetermined maximum value.

The bearing structure described above may be used for rotatably supporting any rotatable structure or load on a base or supporting structure where any of these structures are exposed to substantial varying forces, such as wind forces or vibration. The rotatable structure may, for example, be rotatable towers, viewpoint platforms, restaurants, and the like. The bearing structure according to the invention may also be used for gun turrets on war ships and turrets or rigs on other type of floating vessels.

According to another aspect the present invention provides a floating vessel comprising a hull, and a turret or rig mounted rotatably about its axis in relation thereto by means of at least one bearing structure, each said bearing structure comprising a first annular bearing surface divided into sections and mounted on said hull, a second annular bearing surface defined on the turret and engaging with and supported by said first bearing surface, and control means for controlling the position of said bearing surface sections so as to compensate for possible deflection or distortion of the supporting hull and to maintain said sections in supporting engagement with said second bearing surface.

The turret or rig of a floating vessel is normally exposed not only to vertically acting forces (gravitation and rough seas), but also to horizontally directed forces (wind and sea). Therefore, the turret or rig is preferably mounted by means of an axial bearing structure having its plane second bearing surface formed on the turret or rig as well as a radial bearing structure having a cylindrical second bearing surface which is also formed on the turret or rig.

The invention will now be further described with reference to the drawings, wherein.

Figure 1:
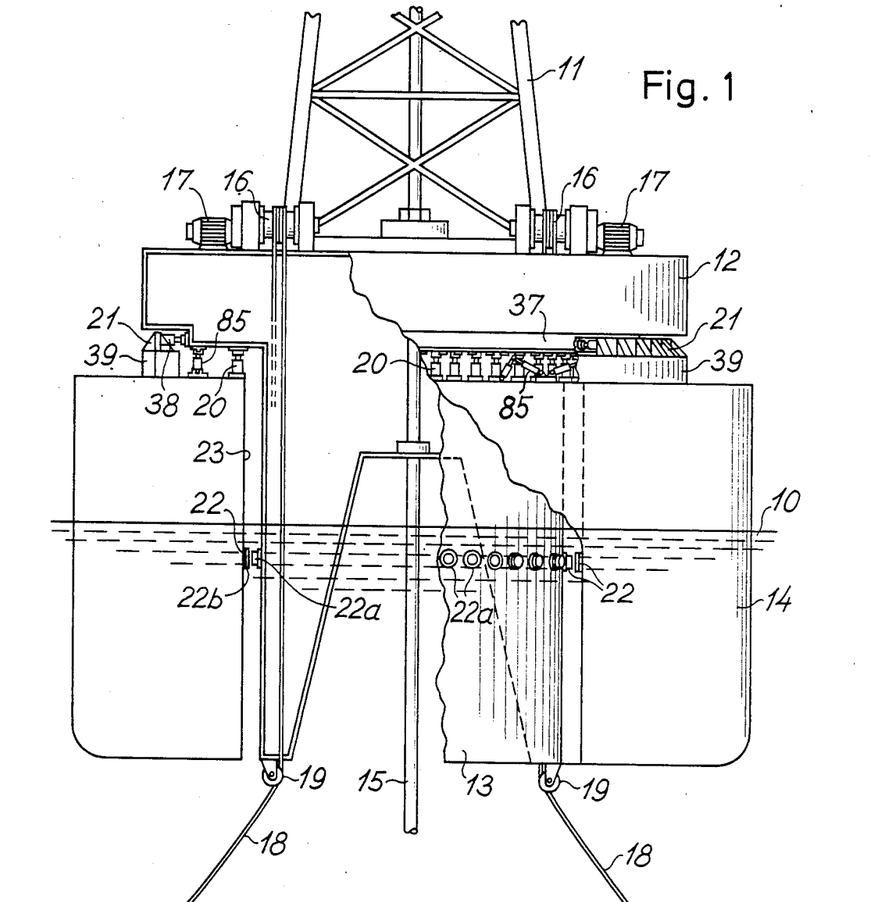
FIG. 1 is an end view and partially sectional view of a floating oil production vessel according to the invention, FIG. 2 diagrammatically illustrates a principle of operation of the bearing structure according to the invention.

FIG. 1 shows a production vessel for use in offshore production of oil or gas from a bore well at the bottom of a sea 10. A turret or rig 11 comprising a base or platform 12 and an annular stabilizing skirt 13 extending downwardly therefrom is mounted on a hull 14 of the vessel. A riser tuber 15 extends from a bore well at the bottom of the sea centrally into the turret or rig 12. A number of winches 16 driven by electric motors 17 are mounted on the upper side of the platform 12. Each of a plurality of mooring lines 18 extending from the winches 16 to anchoring devices (not shown) placed at the bottom of the sea, is passed over a pulley 19 mounted at the lower end of the skirt 13. While only two of the mooring lines are shown in FIG. 1, six or eight mooring lines are normally used.

The turret or rig 11 is mounted rotatably in relation to the hull 14 by means of an axial bearing structure 20, a radial bearing structure 21, and an emergency bearing 22 comprising resilient buffer members 22a (for example made from rubber) mounted on the outer wall of the skirt 13 and annular members 22b (for example made from steel) mounted on an adjacent cylindrical wall 23 of the hull 14 defining a cylindrical opening extending vertically through the hull.

The axial bearing structure 20 comprises an annular bearing surface 24 defined on flanges 25 (see FIG. 4) at the bottom side of the platform 12 as best shown in FIG. 1. The bearing surface 24 is substantially plane, and the flanges 25, which are preferably made from stainless steel, are dimensioned and supported so that the surface 24 remains substantially plane during use of the vessel. A plurality of annularly arranged bearing blocks 26 each having a substantially plane bearing surface section 27 defined thereon form together an annular bearing surface which is in sliding engagement with the bearing surface 24 on the flange 25. Each bearing block 26 is mounted in a socket member 28, which is in turn mounted at the upper end of a piston rod or piston member 29 of a cylinder or jack 30 by means of screws 31 or similar fastening members. The cylinder is preferably a hydraulic cylinder, but may be pneumatic, or the cylinder may contain a mechanical compression spring biassing the piston rod 29 outwardly from the cylinder. The bearing blocks 26 are made from a suitable bearing material, such as that marketed by GLACIER GmbH DEVA-Werke, D-3570 Stadtallendorf 1, Western Germany under the tradename DEVA METAL (Alloy CuSnPb B8413/8 P-1). The bottom surface of each bearing block 26 may be shaped as a spherical segment, which is received in a complementary shaped, dished depression 32 formed in the upper end of the socket member 28, and the upper end of a flexible sealing sleeve 33 surrounding the upper end of the socket member 28 and fastened thereto by means of screws 34 or similar fastening members, is in sealing engagement with the bearing surface 24 on the flanges 25. Because of the spherical shape of the depression 32 in the socket member 28 in which the bearing block 26 is received, the bearing block may freely adapt its position to possible irregularities on the bearing surface 24. An automatic lubricator 35 which contains lubricating grease placed under pressure (for example by means of a spring or pressurized air) is mounted on the socket member 28 and communicates with the depression 32 through bores 36 formed in the socket member 28. Thus, lubricating grease from the lubricator 35 may lubricate not only the abutting surfaces of the depression 32 and the bearing block 26, but also the annular bearing surface 24 and the bearing surface sections 27 cooperating therewith. The turret supporting pressure recieved by the bearing blocks 26 may be individually controlled by controlling the pressure of the pressure medium supply to the associated cylinders or jacks 30 as described more in detail below.

The radial bearing structure 21 comprises an annular, cylindrical bearing surface 37 formed on the base or platform 12 of the turret, and a plurality of fluid pressure actuated assemblies 38 which are mounted on the hull 14 by means of an annular bracket structure 39.

Figure 5:
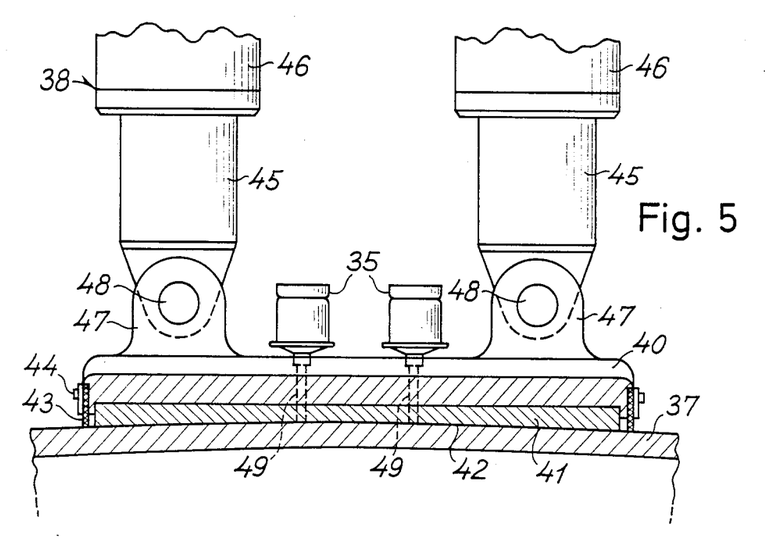
FIG. 5 is a side view and partially sectional view showing parts of a first embodiment of a radial bearing structure according to the invention.

FIG. 5 shows an embodiment of the assembly 38, which comprises a bearing block 40 provided with a layer of bearing metal 41 defining thereon a partially cylindrical bearing surface section 42, which is complementary to and engages with the bearing surface 37 formed on the base 12 of the turret. The wall defining the annular bearing surface 37 may be made from stainless steel, and the bearing metal layer 41 may be made from the above DEVA METAL. The bearing block 40 is surrounded by a flexible sealing sleeve 43, which corresponds to the sealing sleeve 33, shown in FIG. 4, and which is fastened by means of screws 44 or other suitable fastening devices. Piston rods or piston members 45 of a pair of cylinders or jacks 46 are pivotally connected to a pair of lugs or ears 47 on the bearing block 40 by means of pivots 48. The cylinders 46 are preferably hydraulic, but may alternatively be pneumatically or mechanically spring actuated as described above in connection with the cylinders 30. A pair of automatic lubricators 35 containing lubricating grease placed under pressure, for example by means of springs or pressurized air, communicates with bores 49, which extends transversely through the block 40 and opens into the bearing surface section 42 for automatically greasing the cooperating bearing surfaces.

The fluid pressure actuated assemblies 38 are placed uniformly spaced around the annular bearing surface 37 in an annular arrangement with the longitudinal axes of the cylinders 46 extending substantially horizontally or transversely to the substantially vertical axis of the cylindrical bearing surfaces 37 and 42. The pressure transmitted between each bearing surface section 42 and the annular bearing surface 37 may be controlled by controlling the pressure of the pressure medium supply to the associated cylinders or jacks 46 as described more in detail below.

Figure 6:
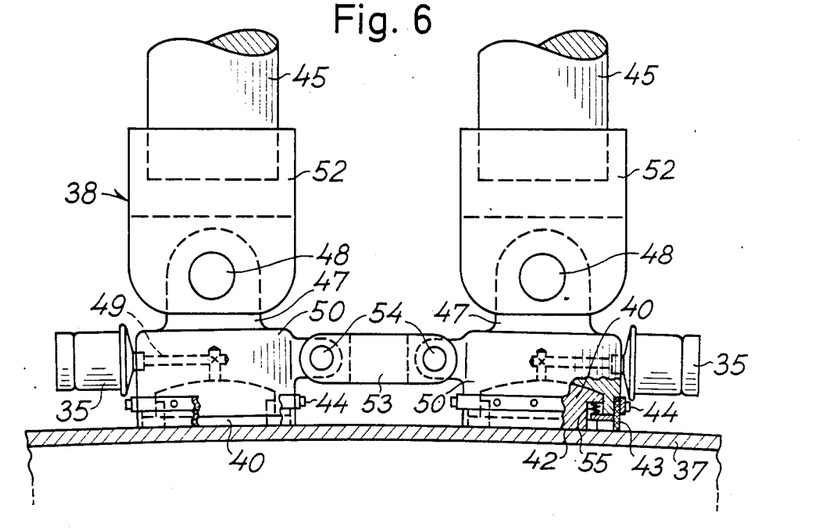
FIG. 6 is a side view and partially sectional view of parts of a second embodiment of a radial bearing structure according to the invention.

FIG. 6 illustrates a modified embodiment of the assembly 38 shown in FIG. 5, and similar parts in FIGS. 5 and 6 are provided with similar reference numerals. In FIG. 6 the bearing blocks are of the same type as the blocks 26 described in connection with FIG. 4. Each of these bearing blocks are tiltably received in a socket member 50 on which the ears or lugs 47 are formed, and each lug 47 is received in and pivotally connected to a connecting member 52 mounted on the associated piston rod or piston member 45. The plurality of fluid pressure actuated assemblies 38 comprised by the radial bearing structure 21 are grouped in pairs, and the sockets 50 of each pair are interconnected by means of a linking member 53 having its opposite ends pivotally connected to the adjacent socket 50 at 54. Spring members 55 are arranged within the sockets 50 so as to bias the spherical surface sections of the bearing blocks into engagement with the complementary surfaces formed in the sockets 50.

The structure of the turret or rig 11 is relatively stiff, which means that the annular bearing surface 24 will remain relatively plane and that the annular bearing surface 37 will remain substantially cylindrical, even when the vessel is exposed to extreme weather conditions. However, the hull 14 of the vessel, which may be exposed to rather high forces, is more flexible, and this means that the annular bearing surface defined by the bearing sections 27 would not remain plane and that the annular bearing surface defined by the bearing surface sections 42 would not remain cylindrical, if these bearing surface sections were mounted rigidly on the hull 14 of the vessel. However, as indicated above, the hydraulic cylinders or jacks 30 and 46 described above may compensate for deflection or distortion of the hull 14 so that the surface sections 27 and 42 are adjusted so as to define a plane and cylindrical surface, respectively.

Figure 2:
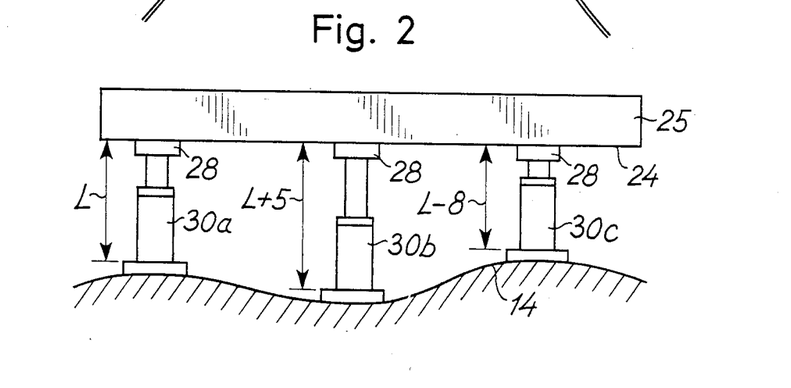
Figures 3, 4:
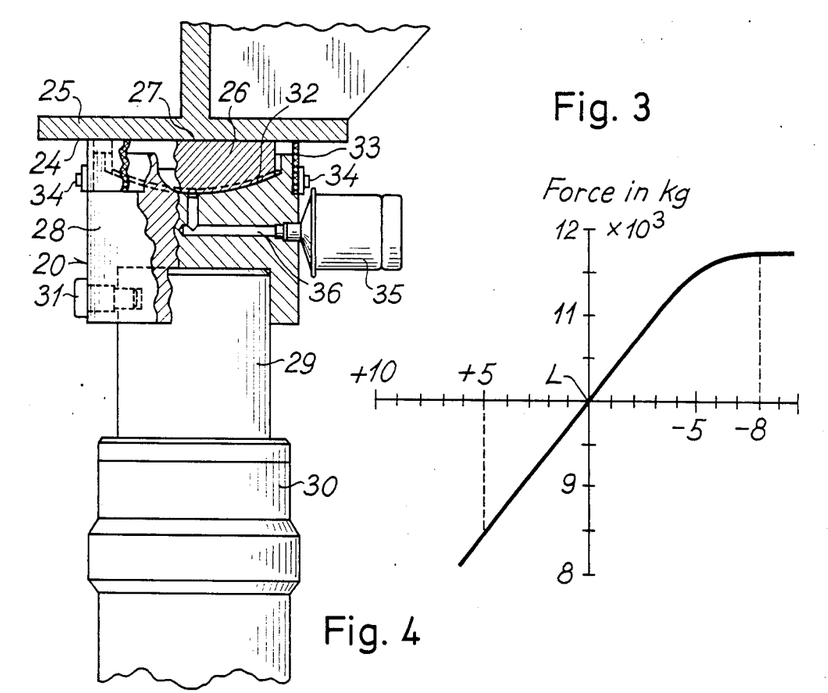
FIG. 3 is a graph showing the pressure of a hydraulic liquid supplied to supporting cylinders or jacks as a function of a varying distance.
FIG. 4 is a side view and partially sectional view showing parts of an axial bearing structure according to the invention.

The function of the bearing structure 20 is diagrammatically illustrated in FIGS. 2 and 3. It is supposed that the desired nominal distance between the annular bearing surface 24 and the base of the cylinders or jacks 30, which are mounted on the upper deck of the hull 14, is L. Due to deflection or distortion of the deck or hull structure, this distance will vary substantially for the rather big number of cylinders or jacks 30 used in the bearing structure 20. FIG. 2 shows three cylinders 30a, 30b, and 30c, for which the distances are L, L+5, and L−8, respectively. Each of the cylinders 30 may be operated so as to function as a variable rate spring having a non-linear characteristic of a desired form. FIG. 3 shows an example of such a characteristic. From FIG. 3 it is seen that pressure medium will be supplied to the various cylinders or jacks 30 at a pressure varying in response to the distance between the bearing surface 24 and the deck of the hull 14 at the respective cylinder. Thus, the pressure of the pressurized medium supplied to the cylinders or jacks 30a, 30b, and 30c, shown in FIG. 2, is controlled so as to obtain a total piston force of $10 \times 10^3$ kg, $8.7 \times 10^3$ kg, and $11.7 \times 10^3$ kg, respectively. Because the cylinder or jack forces increase with decreasing distance or length, the cylinders or jacks tend to counteract deflection or distortion of the hull. However, in order to avoid excessive local stresses in the supporting structure, the force, which may be exerted by the cylinders or jacks 30 is preferably limited to a predetermined maximum value, so that the "spring characteristic" of each of the cylinders or jacks flattens out at that maximum value as shown in FIG. 3.

Figure 7:
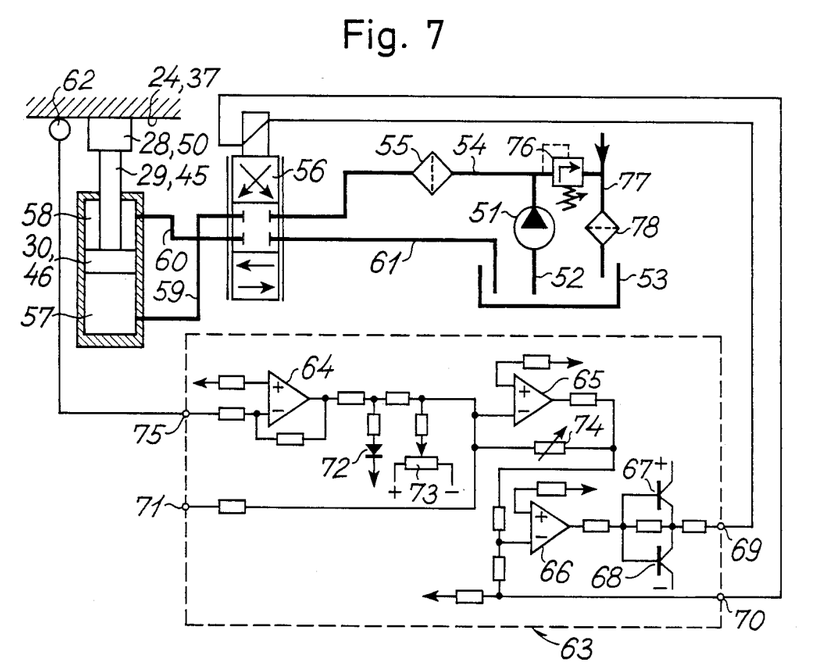
FIG. 7 is a diagram showing a first embodiment of a hydraulic system for actuating the cylinders or jacks included in the axial and radial bearing structures.

FIG. 7 diagrammatically illustrates a hydraulic control system, which may be used for controlling the function of a single cylinder or a group of the cylinders or jacks included in each of the axial and radial bearing structures 20, and 21, respectively. The control system shown in FIG. 7 comprises a hydraulic pump 51 (preferably a fixed volume pump) having a suction line 52 communicating with a hydraulic medium reservoir 53, and having a pressure line 54, which includes a filter 55, connected to a solenoid operated valve 56. The cylinder or jack 30, 46, which is double-acting, has two cylinder chambers 57 and 58. These chambers are connected to the valve 56 by means of connecting lines 59 and 60, respectively. The valve 56 is also connected to the reservoir 53 by means of a return line 61. The pressure relief valve 76 ensures that the pressure in the pressure line 54 does not exceed a predetermined maximum value, and the outlet of the valve 76 is communicating with the reservoir 53 through a return line 77 including a filter 78.

The distance between the annular bearing surface 24, 37, and the surface on which the cylinder or jack 30, 46 is mounted is sensed by means of a suitable distance sensing device 62, such as a position transducer, and the function of the valve 56 is controlled by means of an electronic control device 63 in response to distance or position signals received from the sensor 62. If the supporting pressure exerted by the cylinder or jack 30, 46 is to be increased, the lines 54 and 59 as well as the lines 60 and 61 are interconnected so that the chamber 57 is connected to the pump 51 and the chamber 58 is connected to the reservoir 53. If, however, the pressure exerted by the cylinder or jack 30, 46 is to be decreased because the sensor 62 detects an increasing distance, the valve 56 is operated so as to interconnect the pressure line 54 and the line 60, as well as the line 59 and the return line 61.

The electronic control device 63 is a three-stage non-linear amplifier comprising a first stage or input stage including a first operational amplifier 64, which is connected in an inverting, high gain mode, a second stage constituted by a second operational amplifier 65, which is connected in an inverting, variable gain mode, and a third stage or output stage, which is constituted by a third operational amplifier 66 together with a fully complementary transistor output pair. The fully complementary transistor output pair is constituted by a pnp-output transistor 67 and a npn-output transistor 68. The coil or the coils of the solenoid valve 56 is/are connected in the feedback branch of the third stage or output stage constituted by the third operational amplifier 66 and the output transistors 67 and 68 through output terminals 69 and 70. The first stage or input stage of the three-stage non-linear amplifier further includes a non-linear element or a diode 72 and a potentiometer 73, which is connected between the positive and negative supply rails, which also supply power to the amplifiers 64-66 and the output transistors 67 and 68. The diode 72 and the potentiometer 73 serve the purpose of defining the point of non-linearity of the non-linear characteristic or "spring characteristic" curve shown in FIG. 3. The diode 72, which is connected across the output of the first operational amplifier 64 and ground serves the purpose of limiting the positive output voltage supplied from the output of the first operational amplifier 64 to a value below the feed forward voltage of the diode 72. Provided the output of the first operational amplifier 64 exceeds the feed forward voltage of the diode 72, i.e. exceeds a voltage of 0.6–0.7 V, the diode 72 short-circuits part of the voltage supplied from the output of the first operational amplifier 64 to earth. The potentiometer 73 defines the origin of the curve shown in FIG. 3, as a voltage within the range of the positive and negative supply rail voltages is superimposed the voltage supplied from the output of the first operational amplifier 64 and limited by the non-linear element 72 to the second operational amplifier 65. The gain of the second operational amplifier 65 and consequently the magnitude of the non-linear characteristic is defined by a potentiometer 74, which is connected in the feedback branch of the second operational amplifier 65. The distance or position signal generated by the sensor 62 is input to the electronic control device 63 through an input terminal 75, and the output of the first stage of the three-stage non-linear amplifier and the input of the second stage of the three-stage non-linear amplifier is connected to a terminal 71. The terminal 71 serves servicing purposes and renders it possible to tune the first stage by supplying a predetermined voltage to the input terminal 75 and by monitoring the non-linear characteristic of the first stage and, if necessary, tune the potentiometer 73, and further to tune the overall gain of the three-stage non-linear amplifier by supplying a predetermined input voltage to the terminal 71 and by monitoring the overall gain of the second and third stages of the three-stage non-linear amplifier at the output terminal 69 and, if necessary, to tune the gain of the second stage by means of the potentiometer 74.

Figure 8:
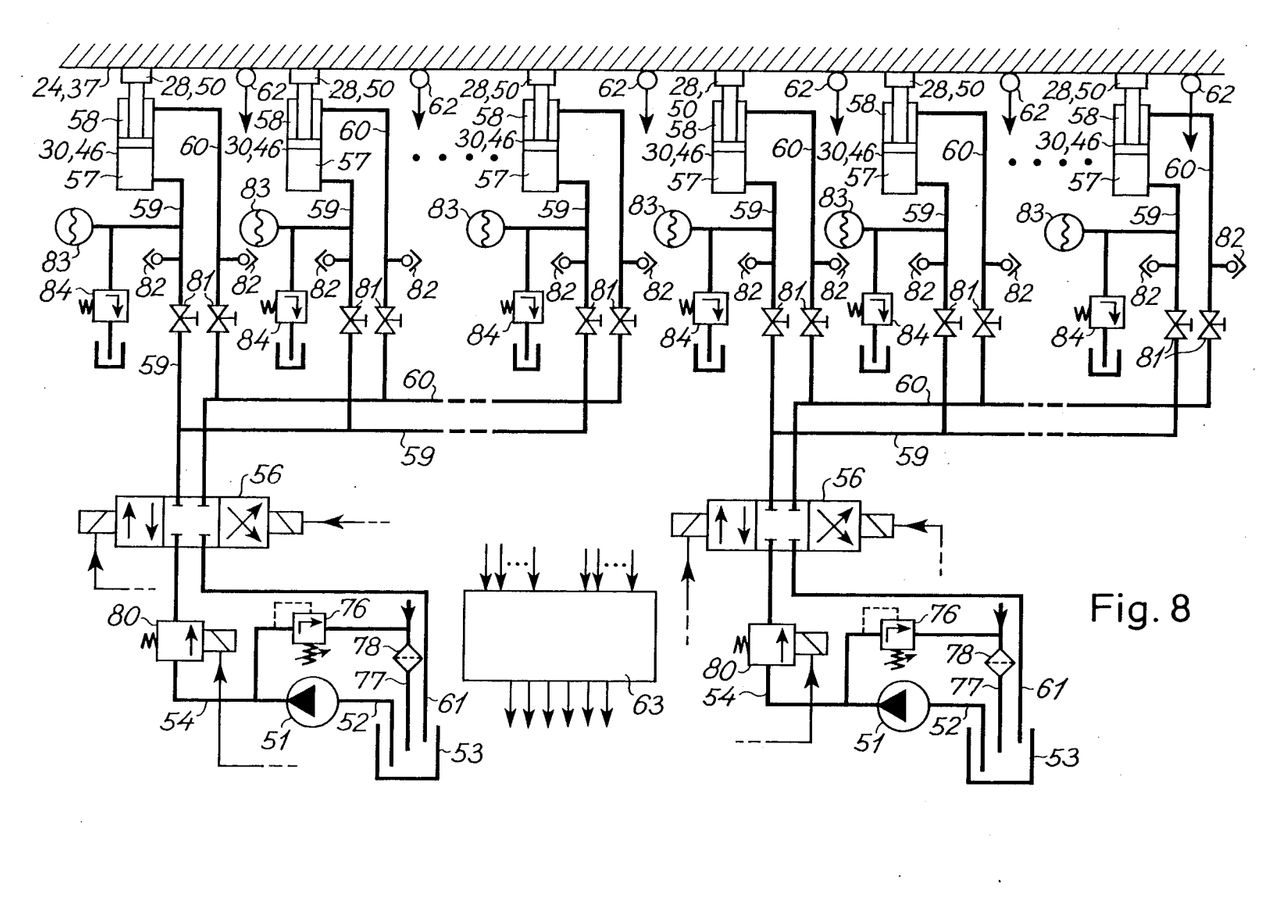
FIG. 8 is a second embodiment of the hydraulic system for actuating the cylinders or jacks.

FIG. 8 shows a modified embodiment of a hydraulic and electronic control system for controlling the operation of the cylinders or jacks 30 or 46 in the axial or radial bearing structures 20 and 21, described above. Parts in FIG. 8 corresponding to those shown in FIG. 7 are provided with similar reference numbers. The cylinders or jacks 30 or 46 included in each bearing structure are divided into a number of groups, and each group is connected to the same hydraulic pump 51, and in FIG. 8 two such groups of cylinders and their associated hydraulic control systems are shown. The pressure line 54 includes a pressure control valve 80, which is adapted to close automatically in case power supply to the control system fails. In such case the cylinders or jacks 30, 46 are locked in their actual positions. Each branch of the connecting lines 59 and 60 includes manually operatable closure valves 81, by means of which a selected group of cylinders or jacks 30, 46 may be separated from the system, and liquid may be drained off through drain valves 82, so as to enable replacement and/or repair of the respective cylinder or jack or associated parts. Each branch of the connecting line 59 additionally contains a cavitation preventing device 83, which is adapted to compensate for sudden pressure drops in the cylinder chambers 57 caused by a sudden movement of the cylinder piston. Each branch of the connecting line 59 may also contain a safety valve 84 for ensuring that the pressure within the cylinder chambers 57 does not exceed a predetermined maximum value.

In the system shown in FIG. 8 the pressure control valve 80 controls the pressure supplied to the cylinders or jacks 30 or 46 of the group, and the operation of the valves 80 is controlled by the electronic control device 63 in response to signals received from the sensing devices 62. Thus, in the system shown in FIG. 8 the valves 56 are not used for controlling the pressure supplied to the cylinder chambers. The valves 56 may, however, be used for changing the line connections so that the cylinder chambers 58 are connected to the pressure line 54, while the cylinder chambers 57 are connected to the return line 51. In the system shown in FIG. 8 the valves 56 may be dispensed with, if desired. Otherwise, the hydraulic system shown in FIG. 8 operates in substantially the same manner as that shown in FIG. 7 controlled by the electonic control device 64, which may, for example, be a computer, which may also be used for controlling the function of other apparatuses and devices in the vessel.

Figure 9:
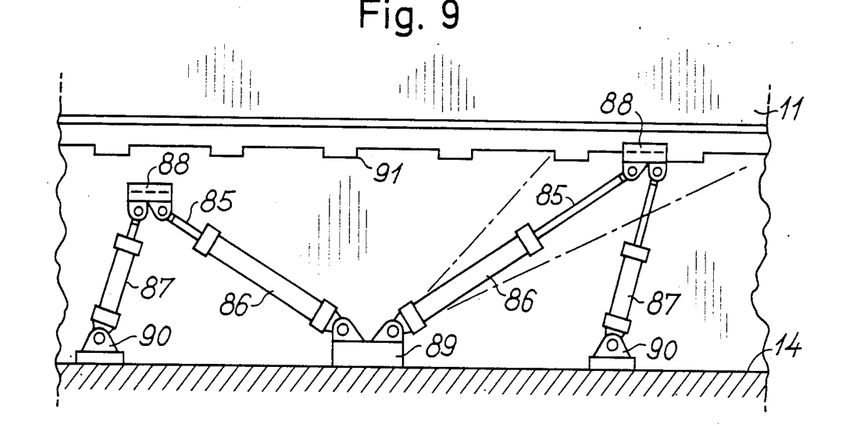
FIG. 9 is fractional side view showing a hydraulic cylinder assembly for rotating the turret of the vessel about its axis.

The turret or rig 11 may be rotated in relation to the hull 14 by means of hydraulic cylinder assemblies 85, each comprising a pair of cylinders, including a driving cylinder 86 and a lifting cylinder 87. The piston rods of the driving and lifting cylinders in each assembly 85 are pivotally connected to a common pawl or driving member 88, while the other ends of the cylinders 86 and 87 are pivotally connected to mounting members 89 and 90, respectively, which are fastened to the deck 14. The pawl members 88 of the cylinder assemblies 85 are adapted to drivingly engage with a ratchet formation 91 formed on the turret or rig 11, and the function of the cylinder assemblies 85 is controlled by a hydraulic and electronic control system diagrammatically shown in FIG. 10. FIG. 9 shows two cylinder assemblies 85, and these assemblies are adapted to rotate the turret or rig 11 in opposite directions. A plurality, for example four, of such pairs of assemblies are provided, and the lifting cylinder 87 in each assembly is used for moving the pawl or driving member 88 into or out of engagement with the ratchet formation 91, while the driving cylinder 86 is used for driving the turret or rig 11 in the desired direction when the associated pawl member 88 is in engagement with the ratchet formation 91. This means that all of the pawl members 88 associated with assemblies for driving the turret or rig 11 in one direction are kept out of engagement with the ratchet formation 91 when the remaining assemblies are rotating the turret or rig in the opposite direction, and vice versa.

Figure 10:
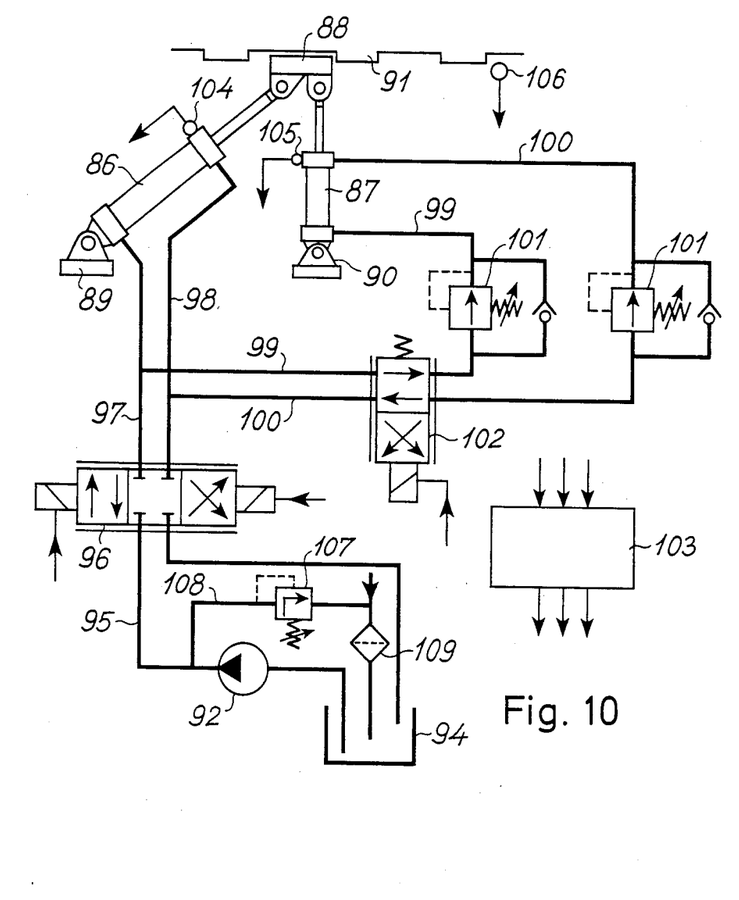
FIG. 10 is a diagram showing a hydraulic system for operating the hydraulic cylinder assembly shown in FIG. 9.

FIG. 10 shows a hydraulic and electronic control device for operating the group of cylinder assemblies 85 adapted to drive the turret or rig 11 in one and the same direction. The hydraulic system shown in FIG. 10 comprises a constant pressure pump 92 having a suction line 93 communicating with a hydraulic medium reservoir 94. A pressure line 95 of the pump is connected to a solenoid operated valve 96 of the same type as the valve 56 shown in FIG. 7. A pressure relief valve 107 corresponding to the valves 76 shown in FIGS. 7 and 8 controls a return line 108, which includes a filter 109 and is connected to the pressure line 95. Connecting lines 97 and 98 connect the valve 96 to the chambers of the double-acting cylinder 86, and these lines are also connected to the chambers of the double acting lifting cylinder 87 through lines 99 and 100, each of which contains a pressure reduction valve 101 for reducing the pressure of the hydraulic medium supplied to the chambers of the lifting cylinder 87 to a small fraction of the pressure of the medium supplied to the driving cylinder 96. Because the valve 96 may cause the driving cylinder 86 to rotate the turret or rig 11 either by drawing or by pushing, the lines 99 and 100 pass a valve 102 for changing the connections of the lines 99 and 100 so as to change the operation of the lifting cylinder 88 correspondingly, when the operation of the driving cylinder 86 is changed. The operation of the valves 96 and 102 and, consequently, of the cylinder assemblies 85 may be controlled by an electronic control system or computer 103, which is preferably the same computer or electronic control device as that designated 63 in FIG. 8, and which receives signals from cylinder stroke sensors 104 and 105, and from a turret position sensor 106. The cylinder stroke sensors 104 and 105 may, for example, be proximity switches for sensing the end positions of the cylinder strokes. The turret may be locked against rotational movement by setting full pressure on all of the cylinders so as to bring all of the pawl or driving members 88 into engagement with the ratchet formation 91, whereafter the pressure supply lines to the pressurized cylinder chambers may be closed off. Possible rotational drift of the turret or rig due to leaking cylinders may be detected by means of linear transducers arranged on some of the cylinders. The turret position sensor 106 detects the mutual position of the turret and the hull of the vessel.

EXAMPLE

A turret or rig 11 having a weight of about 3,000 tons is supported by an axial bearing structure of the type shown in FIG. 4 and having a diameter of 1540 cm, and by a radial bearing structure of the type shown in FIG. 6 and having a dimater of 1720 cm. Each of the bearing structures includes 180 bearing blocks 26 or 40 supported by the same number of cylinders or jacks, and these cylinders are divided into nine groups including 20 cylinders each. The groups of cylinders are controlled by means of a hydraulic and electronic control device as that shown in FIG. 8, and the pressure of the hydraulic medium supplied to the cylinders or jacks in each group is controlled in accordance with a "spring characteristic" as that shown in FIG. 3.

We claim:
1. A bearing structure for mounting a heavy load on a supporting structure, so that the load is rotational about a substantially vertical axis of rotation, said bearing structure comprising:
   (a) a plurality of separate first bearing means mounted on the supporting structure and each defining a bearing surface section thereon, the bearing surface sections defined by said plurality of first bearing means defining in combination a first annular, substantially plane bearing surface;
   (b) second bearing means defining thereon a second annular substantially plane bearing surface engaging with and being supported by said first bearing surface, said first and second bearing surfaces being mutually rotatable about the substantially vertical axis of rotation; and,
   (c) position control means for controlling the position of said first bearing means by selectively increasing and reducing supporting pressure between the bearing surface sections and the second bearing surface in response to reduction and increase, respectively, of distance between the respective bearing surface sections and the supporting structure.

2. A bearing structure according to claim 1, further comprising an additional bearing including co-operating annular, substantially circularly cylindrical third and fourth bearing surfaces having a common axis coinciding with said axis of rotation.

3. A floating vessel comprising a hull and a turret mounted thereon by means of at least one bearing structure so as to be rotatable about a longitudinal axis of the turret, each said bearing structure comprising:
   (a) a plurality of separate first bearing means mounted on said hull and each defining a bearing surface section thereon, the bearing surface sections defined on said plurality of first bearing means defining in combination a first annular bearing surface;
   (b) second bearing means mounted on said turret and defining thereon a second annular bearing surface engaging with and being supported by said first bearing surface, said first and second bearing surfaces being mutually rotatable about said axis; and,
   (c) position control means for controlling the position of said first bearing means by selectively increasing and reducing supporting pressure between the bearing surface sections and the second bearing surface in response to reduction and increase, respectively, of distance between the respective bearing surface sections and supporting parts of the hull.

4. A bearing structure for mounting a heavy load on a supporting structure so as to be rotational about a substantially vertical axis of rotation, and comprising first and second slide bearings;
(a) said first slide bearing including:
  (i) a plurality of separate first bearing means mounted on said supporting structure and each defining a first bearing surface section thereon, the bearing surface sections defined on said plurality of first bearing means defining in combination a first annular, substantially plane bearing surface;
  (ii) second bearing means mounted on said load and defining thereon a second annular, substantially plane bearing surface engaging with and being supported by said first bearing surface;
  (iii) first position control means for controlling the position of said first bearing means by increasing and reducing supporting pressure between the first bearing surface sections and the second bearing surface in response to reduction and increase, respectively, of distance between the respective first bearing surface sections and the supporting structure;
(b) said second slide bearing including:
  (i) a plurality of separate third bearing means mounted on said supporting structure and each defining a third bearing surface section thereon, the bearing surface sections defined on said plurality of third bearing means defining in combination a third annular, substantially circular cylindrical bearing surface;
  (ii) fourth bearing means mounted on said load and defining thereon a fourth annular, substantially circularly cylindrical bearing surface engaging with and being supported by said third bearing surface;
  (iii) second position control means for controlling the position of said third bearing means by increasing and reducing supporting pressure between the third bearing surface sections and the fourth bearing surface in response to reduction and increase, respectively, of distance between the respective third bearing surface sections and the supporting structure;
(c) said first, second, third and fourth annular bearing surfaces having a common axis coinciding with said axis of rotation.

5. A bearing structure according to claim 4, wherein said first and second position control means comprise pressure medium operated hydraulic cylinders interposed between said bearing structure and said first and third bearing means, respectively.

6. A bearing structure according to claim 5, wherein said position control means includes first and second sensors for sensing possible distortion of parts of the supporting structure supporting said first and third bearing means, respectively, and means for controlling the pressure of the hydraulic pressure medium in said cylinders in response to distance between the respective beaering surface sections and the supporting structure parts.

7. A bearing structure according to claim 6, wherein said supporting structure is part of a ship hull while said heavy load is a turret rotatably mounted thereon.

8. A bearing structure according to claim 1, wherein said position control means includes pressure medium operated cylinders interposed between said first bearing means and said supporting structure.

9. A bearing structure according to claim 8, wherein said first bearing means comprise separate bearing blocks defining said bearing sections.

10. A bearing structure according to claim 8, wherein said pressure medium operated cylinders are hydraulic cylinders.

11. A bearing structure according to claim 8, wherein said pressure medium operated cylinders are pneumatic cylinders.

12. A bearing structure according to claim 1, wherein said position control means comprises mechanical spring means interposed between said first bearing means and said supporting structure.

13. A bearing structure according to claim 8, wherein said position control means includes sensors for sensing possible distortion of the supporting structure supporting said first bearing means, and means for controlling the pressure of the pressure medium in said cylinders in response to distance variation between the respective bearing surface sections and the supporting structure.

14. A bearing structure according to claim 9, wherein each of said bearing blocks is freely tiltable in relation to the supporting pressure medium cylinder.

15. A bearing structure according to claim 14, wherein a surface part formed as a spherical segment on each bearing block is in engagement with a complementary surface part defined on the supporting pressure medium cylinder.

16. A bearing structure according to claim 13, wherein said pressure control means are constructed and arranged to limit said supporting pressure increase to a predetermined maximum value.

17. A vessel according to claim 3, wherein said turret is mounted on said hull by means of axial and radial bearing structures having plane and cylindrical second bearing surfaces, respectively, defined by second bearing means mounted on said turret.

18. A vessel according to claim 3, wherein each of the bearing surface sections is defined by a surface part of a bearing block.

19. A vessel according to claim 3, wherein said position control means includes pressure medium operated cylinders mounted on said hull and supporting said first bearing means.

20. A vessel according to claim 19, wherein said pressure medium operated cylinders are hydraulic cylinders.

21. A vessel according to claim 19, wherein said pressure medium operated cylinders are pneumatic cylinders.

22. A vessel according to claim 3, wherein said position control means includes mechanical spring means interposed between said first bearing means and said supporting structure.

23. A vessel according to claim 19, wherein said position control means includes sensors for sensing possible distortion of parts of said hull supporting said first bearing means, and means for controlling the pressure of the pressure medium in said cylinders in response to distance between the respective bearing surface sections and the supporting structure.

24. A vessel according to claim 18, wherein each of said bearing blocks is freely tiltable in relation to the supporting pressure medium cylinder.

25. A vessel according to claim 2, wherein said pressure control means are constructed and arranged to limit said supporting pressure increase to a predetermined maximum value.

26. A vessel according to claim 3, wherein the turret includes winches for mooring lines for anchoring the vessel to a sea bottom.

* * * * *